F. W. ROBINSON.

Steam Engine Governor.

No. 9,306. Reissued July 20, 1880.

Attest

Joseph C. Hosea

Inventor

Francis W. Robinson by L. M. Hosea

Attorney.

UNITED STATES PATENT OFFICE.

FRANCIS W. ROBINSON, OF RICHMOND, INDIANA.

STEAM-ENGINE GOVERNOR.

SPECIFICATION forming part of Reissued Letters Patent No. 9,306, dated July 20, 1880.

Original No. 220,660, dated October 14, 1879. Application for reissue filed April 9, 1880.

*To all whom it may concern:*

Be it known that I, FRANCIS W. ROBINSON, a citizen of the United States, residing at Richmond, Wayne county, Indiana, have invented new and useful Improvements in Steam-Engine Governors, of which the following is a specification.

My invention relates to that class of steam-engine governors in which the centrifugal force of balls connected to arms and rotating about a vertical stem is employed to regulate the admission of steam to the piston; and its object is to improve the utility and efficiency of such governors.

To this end my invention consists, first, in the improved construction of a hollow piston-valve and of its openings and seat, whereby a more immediate and sensitive action of the governor is obtained without wire-drawing the steam; second, in the arrangement and combination of a piston valve and chamber, non-rotating and integral valve-stem having a contact-connection only in one direction with the arms of the regulating-balls, and a spring having a positive connection with the valve-stem and actuating it against the centrifugal force of the balls, whereby lost motion is prevented, sensitive action insured, and a quick stop off obtained in case of breakage of the belt or similar accident; third, in the combination, with the valve, stem, and spring, so arranged and operating, of a tension-screw to regulate the force of the spring as a means of adjusting the action of the governor in relation to the desired speed of the engine while in motion; fourth, in the combination, with the valve-chamber, piston-valve, and stem connected with the regulating-balls, of a curved spring attached at one end to the gear-supporting frame and at its other end to the valve-stem, and a dog pivoted to the frame above the spring and arranged to hold the valve open against the force of the spring, but automatically drop out of contact and leave the spring free to act when the engine is in motion.

My invention is embodied in mechanism illustrated in the accompanying drawings, in which—

Figure 1:
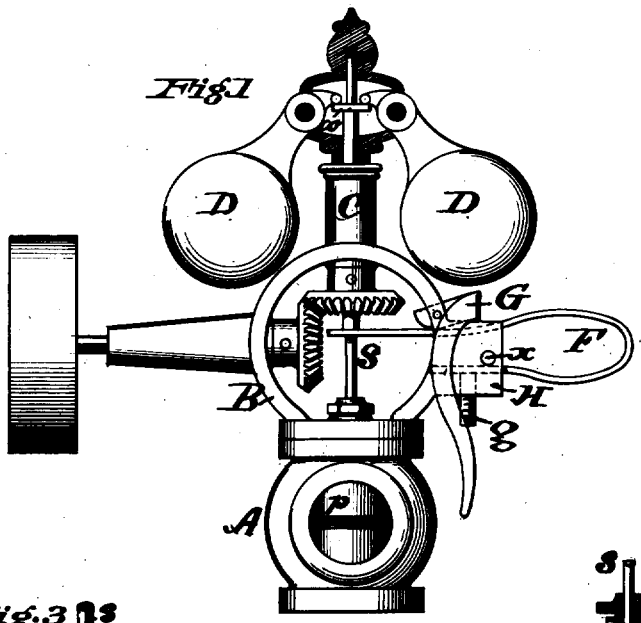
Figure 3:
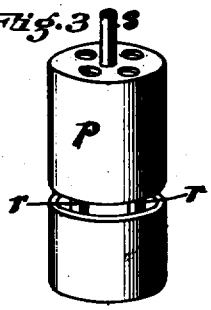
Figure 2:
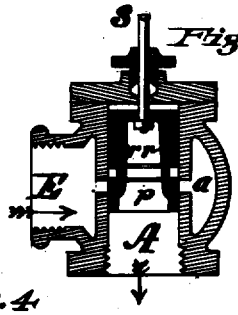
Figure 4:
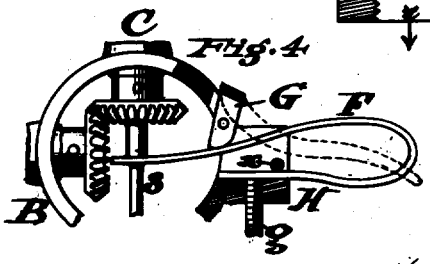

Figure 1 represents a side elevation of my improved governor complete, partly in section. Fig. 2 is a side section of the valve-chamber and valve in position. Fig. 3 is a perspective view of the piston-valve; and Fig. 4 is a side elevation, showing the spring in its depressed condition as held by the dog.

A is the valve-chamber, B the gear-supporting frame, C the hollow standard, and D D the swinging balls, of the governor. The balls are so mounted and arranged that, when they are thrown outward by centrifugal force in their rotation the inner extremities of their arms impinge upon and depress the stem S, which is connected with the regulating-valve, the upward movement of the valve being produced by a spring, as hereinafter described.

The valve-chamber A is cylindrical interiorly and bored for the vertical play of a snugly-fitting hollow piston, *p*. (Shown in Fig. 3.)

The interior periphery of the valve-chamber is cut by a circumferential slot opening into the lateral chamber *a*, cast around the valve-chamber A, and leading to the side steam-pipe, E, through which steam is admitted.

The piston *p* is similarly provided with a circumferential slot opening through its shell into the hollow interior.

Heretofore in the construction of such valves the circumferential slot was not continuous, but made up of a number of perforations separated by portions of the shell, forming connecting-bars between the two portions of the valve.

This construction necessitates a comparatively wide slot and a considerable range of movement of the valve, which is therefore sluggish in its action as a regulator and fails of a most important function—to wit, that of shutting off quickly in case of breaking or flying off of belt.

In order to obtain a narrower opening, I construct the hollow valve *p* with internal ribs, *r*, which enables me to make the slot or opening in the shell of the valve continuous without interfering with the strength of parts. The slot is somewhat enlarged at the inner periphery of the shell, in order to compensate for the space occupied by the ribs *r* and for the reduced diameter of the shell at that point.

When the parts are in position together these slots or openings in the valve and chamber, which are of an area equal to that of the delivery-pipe, register, so that a current of steam passing through the circumferential opening of the valve and chamber passes through the hollow valve and into the delivery-pipe or steam-chest freely and without wire-drawing.

As the valve *p* is moved upward or downward the relative aperture will be decreased to any point or closed entirely, as will be readily seen.

By this construction I obtain in practice the advantage of an exceedingly sensitive movement, by which, in connection with the action of the spring hereinafter set forth, an increase or diminution of speed will cause a corresponding action of the regulating-valve before one revolution of the driving-shaft is completed, so that practically no variations in speed are observed in the engine, (where the power is sufficient,) even under great and sudden variations in the load or work performed.

The valve *p* is operated by a stem, S, secured thereto, and extending upward through an ordinary stuffing-box upon the valve-chamber A and through the hollow standard C, and connected with the arms of the governor-balls D in the following manner: The stem S is continuous and without swivel-joints or breaks of any kind, and rigidly attached to the valve by a nut or screw connection. It is turned off at its upper end a short distance, and a snugly-fitting washer, W, is slipped over the reduced end and down upon the shoulder formed by the main stem. Upon this washer W the rounded inner ends of the pivoted ball-arms have a contact-bearing, and, as will be seen, only to depress the valve. The stem does not rotate, but has only vertical motion, being held by the spring, as hereinafter described.

The gear-supporting frame B is cast with projections H upon one side, between which a spring, F, is secured by means of a pin, *x*, and a set-screw, *g*, the spring being ordinarily only of sufficient force to take up any lost motion between the head of the stem and the swinging arms in order to insure an accurate regulating-movement, its tension being regulated by the set-screw *g*. The spring curves over upon itself, and, passing within the frame B, embraces the stem S, which it therefore tends to sustain against the tendency of the swinging balls when rotating to depress it. The connection between the spring and stem is formed by flattening a portion of the stem, which is embraced within a rectangular open slot in the end of the spring, which thus serves to prevent rotation of the stem while it actuates it vertically, having a positive connection in both directions.

It will be obvious that with a means of regulating the force of a spring thus operating against the centrifugal force of the governor-balls, the action of the governor may be perfectly regulated and controlled and adjusted to the work to be performed by the engine, and so as to overcome any tendency of the parts, when clogged by dirt or impeded by too tightly packed steam-joints, &c., to operate imperfectly, and that by the arrangement of the parts, as shown, this may be done while the engine is in motion.

It will be observed that when the engine is at rest the valve is elevated and closed by the spring, so that the engine cannot be started until the governor-valve is opened, as hereinafter described. An accidental opening of the throttle will therefore have no effect upon the engine. The governor is thus, in the fullest sense, a safety and stop-off governor.

A dog, G, with a projecting handle is also pivoted in the frame B above the spring, and so arranged that when its handle is drawn out its smaller end depresses the spring, and, by consequence, the stem S, and the ports stand fully open independently of the regulating-balls. The friction between the head of the dog and the spring holds the parts in this position for the time being and the steam flows freely into the engine; but as soon as the balls acquire some velocity in rotation they depress the stem, and, by consequence, the spring, when the dog falls down by the weight of its handle and allows the spring to vibrate freely, except as controlled by the regulating-balls.

It is intended to use the dog only in starting the engine. As soon as the motion of the engine is established the dog will drop automatically out of gear and allow the governor to act normally.

I am aware that in steam-engine governors a pivoted lever has been connected at one end with the valve-stem of a piston-valve, the other end being acted on by a coiled spring contained in a cylindrical case, said lever being held and automatically released by a weighted pawl; and I am also aware that a pivoted lever has been connected at one end with the valve-stem of a piston-valve and weighted at its outer end, being held and automatically released by a weighted pawl pivoted beneath the weighted end of the lever, and such I hereby disclaim.

Having described my invention, I claim and desire to secure by Letters Patent—

1. The combination, in a fly-ball steam-engine governor, of a cylindrical valve-chest having a transverse lateral opening with a piston-valve continuously hollow, constructed with internal ribs and a single continuous transverse opening widening inwardly, as set forth.

2. In a steam-engine governor, the combination of the following elements, to wit: a hollow piston-valve with continuous circumferential opening registering with a corresponding opening in a cylindrical valve-chamber, in which it plays, closing in both directions; an integral non-rotating valve-stem rigidly secured at one end to the valve and having contact-connection only at its other extremity with the regulating-arms, and an exterior curved plate-spring actuating the valve-stem against the regulating-arms, arranged and operating substantially as and for the purpose specified.

3. In a steam engine governor, the combination of the following elements, to wit: the piston-valve *p*, valve-chamber A, integral stem S, regulating-balls D, curved spring F, actuating the stem against the force of the balls, and a tension-screw, *d*, to regulate the force of the spring, arranged and operating substantially as and for the purpose specified.

4. In combination with the valve-chamber A, valve *p*, stem S, and regulating-balls D, a curved spring, F, attached at one end to the supporting-frame B, and at its other or free end to the valve-stem, and a dog, G, pivoted to the supporting-frame above the free end of the spring and provided with a projecting handle, constructed, arranged, and operating substantially as and for the purpose specified.

In testimony whereof I have hereunto set my hand this 31st day of March, 1880, in presence of two subscribing witnesses.

F. W. ROBINSON.

Witnesses:

HENRY E. ROBINSON,

HARRY M. YEO.